United States Patent
Disano et al.

(10) Patent No.: US 10,761,799 B2
(45) Date of Patent: Sep. 1, 2020

(54) INFERENCE OF AN INTENDED PRIMARY DISPLAY OF A HINGED MOBILE DEVICE

(71) Applicant: Microsoft Technology Licensing, LLC, Redmond, WA (US)

(72) Inventors: Robert Joseph Disano, Seattle, WA (US); Christian Klein, Duvall, WA (US); Katherine Blair Huffman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 15/619,238

(22) Filed: Jun. 9, 2017

(65) Prior Publication Data

US 2018/0356904 A1    Dec. 13, 2018

(51) Int. Cl.
*G06F 3/14*        (2006.01)
*G06F 3/0346*      (2013.01)
(Continued)

(52) U.S. Cl.
CPC ............ *G06F 3/1423* (2013.01); *G06F 1/162* (2013.01); *G06F 1/1618* (2013.01);
(Continued)

(58) Field of Classification Search
CPC .... G06F 1/1647; G06F 1/1649; G06F 3/1423; G06F 1/1616; G06F 1/1618; G06F 1/3265; G06F 1/3231; G06F 1/1641; G06F 3/0346; G06F 2200/1614; G06F 2200/1637; G06F 1/3206; G06F 1/1677; G06F 3/0487; G06F 3/0416; G06F 3/017; G06F 3/0481; G06F 3/04847; G06F 3/048; G06F 3/0484; G06F 3/1446; G06F 1/162; H04M 1/0214; H04M 2250/12; H04M 2250/16; H04M 1/0206; H04M 1/0216; H04M 1/0241; H04M 1/0247
See application file for complete search history.

(56) References Cited

U.S. PATENT DOCUMENTS 8,872,731 B2    10/2014  Gimpl et al.
9,299,350 B1 *   3/2016  Dumont .................. G06F 21/32
(Continued)

OTHER PUBLICATIONS

"International Search Report and Written Opinion Issued in PCT Application No. PCT/US2018/033572", dated Aug. 16, 2018, 14 Pages.
(Continued)

*Primary Examiner* — Nicholas Ulrich

(57) ABSTRACT

Techniques for inference of an intended primary display of a hinged mobile device are described. Generally, the techniques described herein improve a user experience when the user interacts with the device, such as to change the posture of the device. For example, the techniques described herein detect physical movement of a first and/or second display portion of the device. In implementations, the physical movement is recognized as a device gesture to indicate which of the display portions is intended to be used as the primary display. Then, a determination is made that the first display portion is intended to be used as the primary display based on the device gesture. Based on the determination, the primary display is initiated via the first display portion.

20 Claims, 12 Drawing Sheets

(51) Int. Cl.
  *G06F 1/16* (2006.01)
  *G06F 3/0488* (2013.01)
  *G06F 3/01* (2006.01)

(52) U.S. Cl.
  CPC .......... *G06F 1/1643* (2013.01); *G06F 1/1647* (2013.01); *G06F 1/1677* (2013.01); *G06F 1/1694* (2013.01); *G06F 3/017* (2013.01); *G06F 3/0346* (2013.01); *G06F 3/0488* (2013.01); *G09G 2356/00* (2013.01); *H04M 2250/16* (2013.01)

(56) References Cited

U.S. PATENT DOCUMENTS

| | | | |
|---|---|---|---|
| 9,524,139 B2 | 12/2016 | Kurongzeb et al. | |
| 9,544,419 B2 | 1/2017 | Kozaczuk et al. | |
| 2010/0321275 A1* | 12/2010 | Hinckley | G06F 1/1618 345/1.3 |
| 2011/0228463 A1 | 9/2011 | Matagne et al. | |
| 2012/0026069 A1* | 2/2012 | Ohsaki | G06F 1/1616 345/1.2 |
| 2012/0081270 A1 | 4/2012 | Gimpl et al. | |
| 2012/0083319 A1 | 4/2012 | Sirpal et al. | |
| 2012/0326945 A1 | 12/2012 | Ellis et al. | |
| 2013/0076656 A1* | 3/2013 | Sirpal | G06F 3/1438 345/173 |
| 2013/0249873 A1* | 9/2013 | Zhang | G09G 3/22 345/204 |
| 2014/0132514 A1* | 5/2014 | Kuzara | G06F 1/1647 345/158 |
| 2014/0375582 A1* | 12/2014 | Park | G06F 3/0414 345/173 |
| 2015/0116362 A1* | 4/2015 | Aurongzeb | H04N 7/15 345/650 |
| 2015/0244940 A1* | 8/2015 | Lombardi | H04N 5/23293 348/333.06 |
| 2015/0317120 A1* | 11/2015 | Kim | G06F 3/1438 345/1.3 |
| 2015/0324162 A1 | 11/2015 | Kim et al. | |
| 2016/0048363 A1 | 2/2016 | North et al. | |
| 2016/0103597 A1 | 4/2016 | Gimpl et al. | |
| 2016/0255187 A1* | 9/2016 | Song | H04M 9/082 455/418 |
| 2018/0321892 A1* | 11/2018 | Kim | G06F 1/1601 |

OTHER PUBLICATIONS

Hinckley, et al., "Codex: A Dual Screen Tablet Computer", In Proceedings of Conference on Human Factors in Computing Systems, Apr. 9, 2009, pp. 1933-1942.

* cited by examiner

INFERENCE OF AN INTENDED PRIMARY DISPLAY OF A HINGED MOBILE DEVICE

BACKGROUND

Mobile devices provide today's user with a variety of different functionalities, and in many instances allow the user to directly interact with objects displayed via touch-sensitive display devices. Devices having multiple display surfaces connected by a hinge, however, introduce complexities that are typically not resolved using conventional gesture input modalities. Such a device can include two portions of the device that each include a display screen and which are connected by a physical hinge that can be manipulated by the user. In the context of a book or journal, for example, a user can view two pages in a way that resembles a paper book or a notebook.

Because of the physical connection between the two portions of the device, the device can be positioned in a variety of different postures, some of which include one display facing the user and the other display facing away from the user. In some instances, the user may wish to interact primarily with one display as opposed to the other. By displaying content on both displays and/or on a secondary display, however, processing bandwidth is consumed as well as valuable battery life. This can detract from user enjoyment and lead to user frustration when using these types of devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for inference of an intended primary display of a hinged mobile device are described. Generally, the techniques described herein adapt a user experience when the user interacts with the device, such as to change the posture (e.g., position and orientation in space) of the device. For example, the techniques described herein detect physical movement of a first and/or a second display portion of the device. In implementations, the physical movement is recognized as a device gesture to indicate which of the display portions is intended to be used as the primary display. Further, a determination is made that the first display portion is intended to be used as the primary display based on the device gesture. Based on the determination, the primary display is initiated via the first display portion.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Techniques for inference of an intended primary display of a hinged mobile device are described. A hinged mobile device, for example, represents a device with two (or more) displays attached to one another via a hinge portion. Generally, the techniques described herein improve a user experience when the user interacts with the device, such as to change the posture of the device. For example, the techniques described herein utilize a variety of sensor signals to infer which display of the device the user intends to use as a primary display. In implementations, the user manipulates the device by bending the hinge or physically moving the device to face a different direction. Sensors can be used to detect which display is facing the user and/or which display has the least relative physical displacement in order to infer the user's intended primary display. This inference can be verified using additional data, such as how the user is holding the device, a context associated with the user or the device, behavioral patterns, hand size and shape, sound data, and so on.

Using the sensor signals, the primary display can be selected and in some instances, a secondary display can be turned off or transitioned into a sleep mode to conserve battery life and processing power. In another implementation, touch input to the secondary display can be treated differently than touch input to the primary display, such as by providing particular user interface controls to a primary user via the primary display that are not provided via a secondary display to another user. Further discussion of these and other aspects are provided below in more detail.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
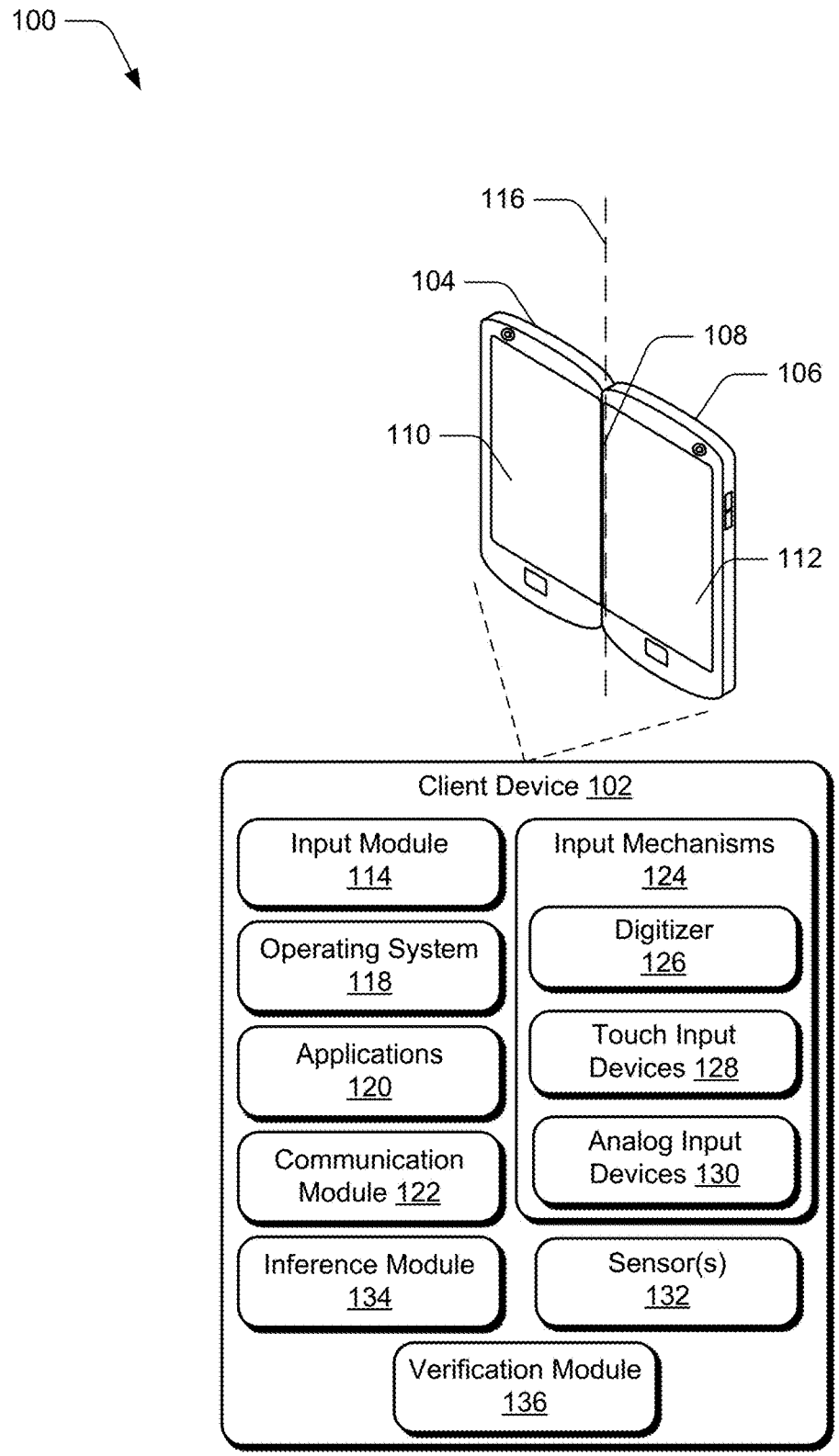
FIG. 1 is an illustration of an environment in an example implementation that is operable to employ the techniques described herein in accordance with one or more embodiments.

FIG. 1 is an illustration of an environment 100 in an example implementation that is operable to employ techniques for inference of an intended primary display of a hinged mobile device discussed herein. Environment 100 includes a client device 102 which can be configured for mobile use, such as a mobile phone, a tablet computer, a wearable device, a handheld gaming device, a media player, and so on. The client device 102 includes a display device 104 and a display device 106 that are connected to one another by a hinge 108. The display device 104 includes a touch surface 110, and the display device 106 includes a touch surface 112. The client device 102 also includes an input module 114 configured to process input received via one of the touch surfaces 110, 112, via the hinge 108, and/or via one or more other sensors 132.

The hinge 108 is configured to rotationally move about a longitudinal axis 116 of the hinge 108 to allow an angle between the display devices 104, 106 to change. In this way, the hinge 108 allows the display devices 104, 106 to be connected to one another yet be oriented at different angles and/or planar orientations relative to each other. In at least some implementations, the touch surfaces 110, 112 may represent different portions of a single integrated and continuous display surface that can be bent along the hinge 108. Thus, the hinge 108 may represent a separate component that hingeably attaches the two separate touch surfaces 110, 112, or the hinge 108 may represent a portion of a single integrated display surface that includes the touch surfaces 110, 112 and about which the touch surfaces 110, 112 can bend.

While implementations presented herein are discussed in the context of a mobile device, it is to be appreciated that various other types and form factors of devices may be utilized in accordance with the claimed implementations. Thus, the client device 102 may range from full resource devices with substantial memory and processor resources, to a low-resource device with limited memory and/or processing resources. An example implementation of the client device 102 is discussed below with reference to FIG. 12.

The client device 102 includes a variety of different functionalities that enable various activities and tasks to be performed. For instance, the client device 102 includes an operating system 118, applications 120, and a communication module 122. Generally, the operating system 118 is representative of functionality for abstracting various system components of the client device 102, such as hardware, kernel-level modules and services, and so forth. The operating system 118, for instance, can abstract various components (e.g., hardware, software, and firmware) of the client device 102 to enable interaction between the components and applications running on the client device 102.

The applications 120 are representative of functionality for performing different tasks via the client device 102. In one particular implementation, the applications 120 represent a web browser, web platform, or other application that can be leveraged to browse websites over a network.

The communication module 122 is representative of functionality for enabling the client device 102 to communicate over wired and/or wireless connections. For instance, the communication module 122 represents hardware and logic for communicating data via a variety of different wired and/or wireless technologies and protocols.

According to various implementations, the display devices 104, 106 generally represent functionality for visual output for the client device 102. Additionally, the display devices 104, 106 represent functionality for receiving various types of input, such as touch input, stylus input, touchless proximity input, and so forth via one or more of the touch surfaces 110, 112, which can be used as visual output portions of the display devices 104, 106. The input module 114 is representative of functionality to enable the client device 102 to receive input (e.g., via input mechanisms 124) and to process and route the input in various ways.

The input mechanisms 124 generally represent different functionalities for receiving input to the client device 102, and include a digitizer 126, touch input devices 128, and analog input devices 130. Examples of the input mechanisms 124 include gesture-sensitive sensors and devices (e.g., such as touch-based sensors), a stylus, a touch pad, accelerometers, a microphone with accompanying voice recognition software, and so forth. The input mechanisms 124 may be separate or integral with the display devices 104, 106, with integral examples including gesture-sensitive displays with integrated touch-sensitive sensors.

The digitizer 126 represents functionality for converting various types of input to the display devices 104, 106, the touch input devices 128, and the analog input devices 130 into digital data that can be used by the client device 102 in various ways. The analog input devices 130 represent hardware mechanisms (e.g., the hinge 108) that are usable to generate different physical quantities that represent data. For instance, the hinge 108 represents a mechanism that can be leveraged to generate input data by measurement of a physical variable, such as hinge angle of the hinge 108. One or more sensors 132, for example, can measure the hinge angle, and the digitizer 126 can convert such measurements into digital data usable by the client device 102 to perform operations to content displayed via the display devices 104, 106.

Generally, the sensors 132 represent functionality for detecting different input signals received by the client device 102. For example, the sensors 132 can include one or more hinge sensors configured to detect a hinge angle between the display devices 104, 106. Additionally, the sensors 132 can include grip sensors, such as touch sensors, configured to detect how a user is holding the client device 102. The sensors 132 can also include motion sensors and/or orientation sensors, such as accelerometers and/or gyroscopes configured to detect physical movement and orientation of the display devices 104, 106 in space or relative movement and orientation with respect to a reference position. In an example, the sensors 132 can include proximity sensors to detect a proximity of the user to one of the display devices 104, 106. Also, the sensors 132 can include audio sensors (e.g., a microphone and/or microphone array) to detect audio associated with an audio source (e.g., the user), such as voice commands issued by the user, and the audio can be used to determine a relative direction of the user with respect to the display devices 104, 106 and which of the display devices 104, 106 is substantially facing the user. Accordingly, a variety of different sensors 132 disposed on each of the display devices 104, 106 and can be implemented to detect various different types of digital and/or analog input. These and other aspects are discussed in further detail below.

In at least some implementations, the applications 120 include or otherwise make use of an inference module 134 and a verification module 136. The inference module 134 and the verification module 136, for example, are included as part of an application or system software, such as the operating system 118. Alternatively, the inference module 134 and the verification module 136 each represent a different standalone application or other functionality.

Generally, the inference module 134 represents functionality for inferring the user's intended primary display, such as by determining which of the display devices 104, 106 the user intends to use as the primary display. The inference module 134 is configured to utilize input signals, such as those detected by the input mechanisms 124 and/or the sensors 132, to determine a posture of the client device 102 based on an orientation and a relative position of the client device 102 relative to the user, the ground, or another reference location, to make such an inference.

The verification module 136 is configured to utilize various sensor signals to determine context information associated with the client device 102 in relation to the user and how the user is using the device. In addition, the verification module 136 can use the context information to verify a gesture being performed and/or to verify the inference made by the inference module 134. By verifying the gesture being performed, the inference module 134 can avoid inadvertent or unintentional input being recognized as a gesture. In addition, by verifying whether the inference module 134 correctly determined which of the display devices 104, 106 the user intended to be the primary display, inference errors can be identified and corrected. Thus, the user's experience can be improved over conventional techniques by smoothly transitioning the display to the user's intended primary display without requiring the user to explicitly select the primary display. Further discussion of this and other features is provided below.

Having described an example environment in which the techniques described herein may operate, consider now a discussion of some example implementation scenarios in accordance with one or more implementations.

Example Implementation Scenarios

This section describes some example implementation scenarios for inference of an intended primary display of a hinged mobile device in accordance with one or more implementations. The implementation scenarios may be implemented in the environment 100 described above, the system 1200 of FIG. 12, and/or any other suitable environment. The implementation scenarios and procedures, for example, describe example operations of the client device 102.

Figure 2:
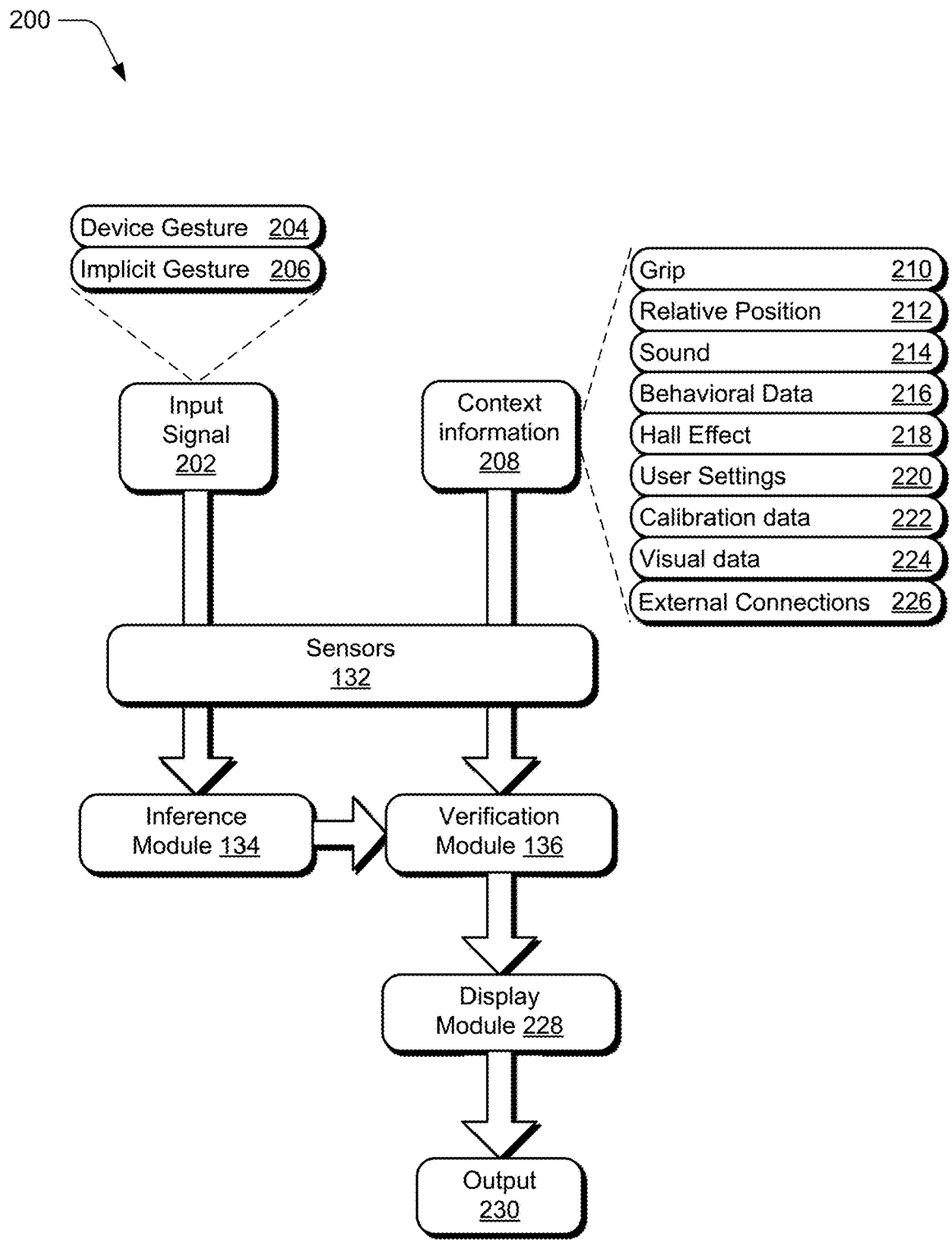
FIG. 2 depicts an example implementation scenario for interaction between various components of the client device from FIG. 1.

FIG. 2 illustrates an example implementation scenario 200 for interaction between various components of the client device 102 from FIG. 1. In the illustrated example, the sensors 132 receive a base input signal 202. The base input signal 202 can be detected from a variety of different input mechanisms, such as a touch input (e.g., via a finger press or stylus input) to the touch surface 110 or the touch surface 112 of the client device 102, a press of a hardware button, a bend in the hinge 108 of the client device 102, a voice command via an audio sensor, or any combination of input mechanisms. In implementations, the base input signal 202 can include a device gesture 204 or an implicit gesture 206. The device gesture 204 is recognized as a physical movement of at least one of the display devices 104, 106 of the client device 102. In implementations, the physical movement leverages the hinge 108 such that a hinge angle between the display devices 104, 106 is changed. For example, the user may open the client device 102 from a closed posture, or further open the client device 102 from an open posture to a flipped posture where the display devices 104, 106 face away from each other in opposite directions. Alternatively, if the client device 102 is in the flipped posture, the user may turn or flip the device over to see the opposite side, which includes a display device that was previously facing away from the user and is now facing toward the user.

The implicit gesture 206 may include physical movement of the client device 102 by the user where the user's goal is not to communicate to the system that the user now has a particular primary display surface, but rather the user is doing something naturally with the client device 102 that can be recognized and detected as a gesture from the system's point of view. For instance, the user may lift the client device 102 from a stationary location (e.g., on a table, or in a pocket), or turn the device to cause a display device to face away from the user and toward another person. From a system point of view, these actions can be considered to be gestures for input, even though the user may not explicitly intend them to be gestures.

The inference module 134 is configured to use the input signal 202 detected by the sensors 132 to infer the user's intended primary display. For instance, the inference module 134 is configured to determine which of the display devices 104, 106 the user intends to be employed as the primary display. The base input signal 202 can indicate an orientation of the client device 102 in space and a position of each display device 104, 106 relative to one another.

In addition, the verification module 136 is configured to utilize a variety of context information 208 to verify the input signal 202 was actually an intentional input rather than an inadvertent or accidental input. Further, the verification module 136 is configured to use the context information 208 to refine the determination made by the inference module 134 as to which display devices 104, 106 is to be the primary display. The context information 208 can be determined based on a variety of support signals that can be interpreted as context related to the client device 102 and/or the user. This context information allows the system to better infer which display device the user intends to use as the primary screen.

The context information 208 can include data or signals associated with one or more of grip 210, relative position 212, sound 214, behavioral data 216, hall effect 218, user settings 220, calibration data 222, visual data 224, and external connections 226. This is not an exhaustive list. Rather, these types of context information 208 are described as examples of the context information 208, and are not to be construed as limiting. Further, the client device 102 can utilize some or all of the context information 208, and can use any subset or combination of different types of the context information 208.

The grip 210 indicates how the user is grasping or holding the client device 102 during and/or after the input signal 202. For instance, the grip 210 can be detected by the sensors 132, such as capacitive strips on the outside of the client device 102 or separate capacitive sensors on the rear exterior of the client device 102. Alternatively or in addition, the grip 210 can be detected based on a capacitance of a display surface on the front of the client device 102. The sensors 132 can detect whether the user has fingers wrapped around the client device 102, which hand (e.g., left or right hand) the user is using to hold the client device 102, in which of a variety of different device postures the user is holding the device, and so on. Accordingly, the grip 210 indicates how the user is holding the device, which is usable to infer how the user intends to use the device.

The relative position 212 refers to a relative position of the client device 102 in relation to the user of the client device 102, in relation to the ground, and/or in relation to another reference location. For example, the relative position 212 can indicate whether the client device 102 is resting on a surface or whether a display device is facing the user. In implementations, the relative position 212 can be used to determine a current posture of the client device 102. Various types of sensors 132 can be employed to determine the relative position 212, including cameras, accelerometers, magnetometers, and so on.

The sound 214 can be used to enable a user to initiate commands audibly. For example, one or more audio sensors can be utilized to detect spoken commands by the user and an approximate direction and/or distance of the audio source (e.g., the user) relative to the client device 102. In this way, the system can determine which display device 104, 106 is facing the user.

The behavioral data 216 is representative of how the user tends to interact with the client device 102 or particular applications executed on the client device 102. For example, when using the client device 102 in a posture that allows the user to view both the display devices 104, 106 simultaneously, the user may tend to run certain applications on the left side (e.g., display device 104) and other applications on the right side (e.g., display device 106). In another example, the user may generally take notes on the right side (e.g., display device 106) of the client device 102 because the user is right-handed, and as a result, the user's hand does not obscure the other display device (e.g., display device 104).

There are many different reasons why a user may have particular preferences related to how the user tends to use the client device 102. The behavioral data 216, although it may not explicitly represent preferences in the form of settings, includes behavioral information about how the user uses the device. Further, using the behavioral data 216, some user actions can be anticipated. For example, when a notetaking application is launched, the system can use the behavioral data 216 to launch the notetaking application via a particular one of the display devices 104, 106 because the system knows the user has a preference for viewing the notetaking application via the particular display device and that the user likely intends that particular display device to be the primary display.

The hall effect 218 refers to the production of a potential difference across an electrical conductor when a magnetic field is applied in a direction perpendicular to that of the flow of current. Hall effect sensors (e.g., magnetometer) can detect magnetic fields in close proximity. In implementations, the hall effect 218 can be used to detect when the client device 102 is opened from a closed posture to an open posture and to automatically turn on one or both of the display devices 104, 106. Alternatively or additionally, the hall effect 218 can be used to turn the display devices 104, 106 off when the client device 102 is manipulated into the closed posture.

The user settings 220 can indicate how the user prefers to use the client device 102, particularly with respect to ergonomics-related user settings that are set by the user or by default. Ergonomics-related user settings can be used to further refine the input signal 202 (e.g., left/right handedness can be used to predict a likely flip direction, or hand size information can be used for more reliable grip detection). By using information associated with the user settings 220, the client device 102 can predict which direction the user is going to turn the device when the user's intent is to flip it over. This functionality can be useful in differentiating situations that are similar in nature, such as a first situation where the user rotates the device 180 degrees to see the reverse side, versus a second situation where the user rotates the device 180 degrees to show a friend content displayed via the primary display. In the first situation, the primary display can be changed to the reverse side to enable the user to view content via the reverse side. In the second situation, however, the user may not desire the primary display to change but may instead desire the primary display to temporarily face away from the user in order to show the displayed content to the friend, likely with the intent of then turning the device back around to continue viewing the original primary display. Accordingly, the user settings 220, alone or in combination with other context information 208, can be used to disambiguate similar situations.

The calibration data 222 describes information about the user, such as user properties that the system is aware of. For example, the calibration data 222 can include hand dimensions representing the size and shape of the user's hand(s) that is grasping the client device 102. The hand dimensions can be used for more reliable grip detection. Further, the hand dimensions can be used to identify the user, the user's handedness (left or right), a shape of the user's fingers, and so on. This information can allow the system to more robustly detect how the user is holding the device, which can then be used to infer which display device is likely intended to be the primary display based on the way the user would predictably perform the device gesture 204 or the implicit gesture 206.

The visual data 224 refers to information captured via an image capturing device, such as a camera of the client device 102. For example, the client device can include multiple integrated cameras. Each display device 104, 106, for instance, can be associated with one or more cameras, such as front-facing or rear-facing cameras. The cameras can capture images and/or video to detect whether a corresponding display device is facing the user. In implementations, the cameras can be used to detect whether the user is looking at a particular display device.

The external connections 226 refer to current connections between the client device 102 and one or more external devices. For example, the client device 102 can be connected to one or more external displays to display content, such as to give a presentation to a group of people. In this example, attention is given to the external device rather than the client device 102. Thus, the external device is likely intended to be the primary display.

Additional context information 208 can include context corresponding to an application being executed or the operating system 118 itself. Based on particular occurrences, the system can anticipate that the user is likely going to perform a device gesture 204. For example, with the ability to switch between front and rear facing cameras, if the user has explicitly selected an in-application command or an operating system-related command that expresses the user's intent of performing a next action, the client device 102 can adjust one or more detection parameters to more aggressively detect posture changes, device gestures 204, and implicit gestures 206, based on a current task and the indication of the next task.

Once the verification module 136 verifies the inferred primary display or corrects the inferred primary display, a display module 228 provides an output 230 for controlling the display devices 104, 106. For example, the display module 228 is configured to control power to each of the display devices 104, 106, and control which of the display devices 104, 106 is to be used as the primary display for output of content. In an example, the display module 228 is configured to cause an application to be displayed via a particular display device, change a power state of a display device (e.g., place a display device that is not intended to be used as the primary display into a low power state or "off" state, or turn on or wake a display device that is inferred to be the user's intended primary display), and so on.

In implementations, different sensors 132 can be used in different implementations based on which gesture is detected, rather than using all the sensors 132 all the time. This can reduce power consumption and extend battery life. For instance, when the user flips the client device 102 over to view the reverse side, certain sensors (e.g., proximity sensors) can be considered for inferring the user's intended primary display. In contrast, when a different gesture is performed, such as a gesture that opens the client device 102, the system can rely less on the proximity sensors and more on grip sensors. For instance, different sensor signals can be weighted differently based on different gestures. Accordingly, the client device 102 can determine, during performance of the gesture, which gesture is being performed and based on that determination, consider particular sensor signals to refine that determination (e.g., to verify that the determined gesture is in fact being performed). Conditionally considering signals from various sensors 132, rather than simply using all the sensors 132 all the time, reduces required processing bandwidth and power consumption, which can lead to a longer battery life.

Figure 3:
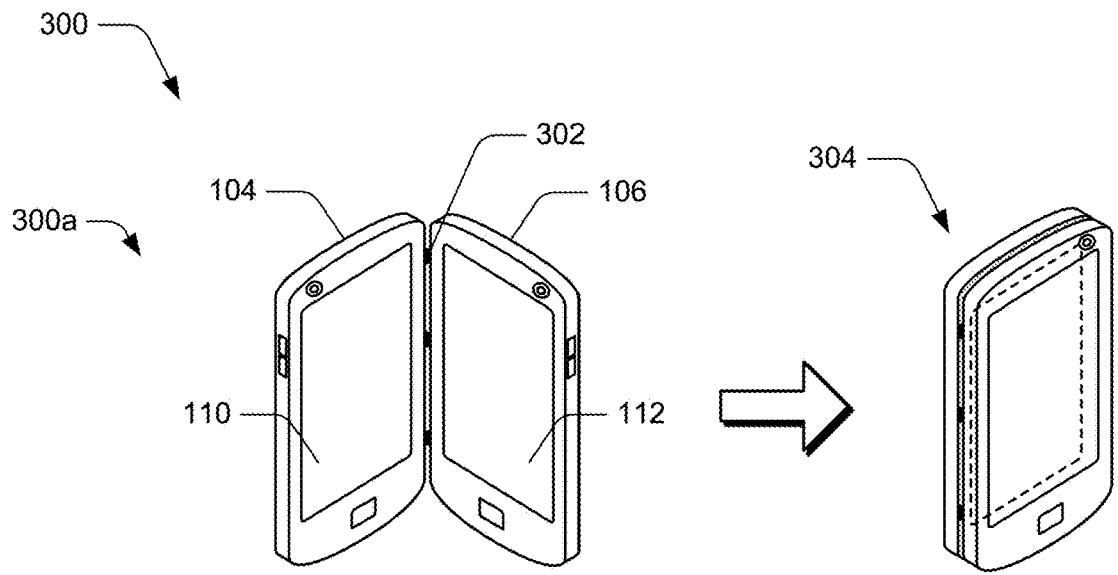
FIG. 3 depicts example implementation scenarios of devices that include functionality for inference of an intended primary display in accordance with one or more embodiments.
Figure 3:
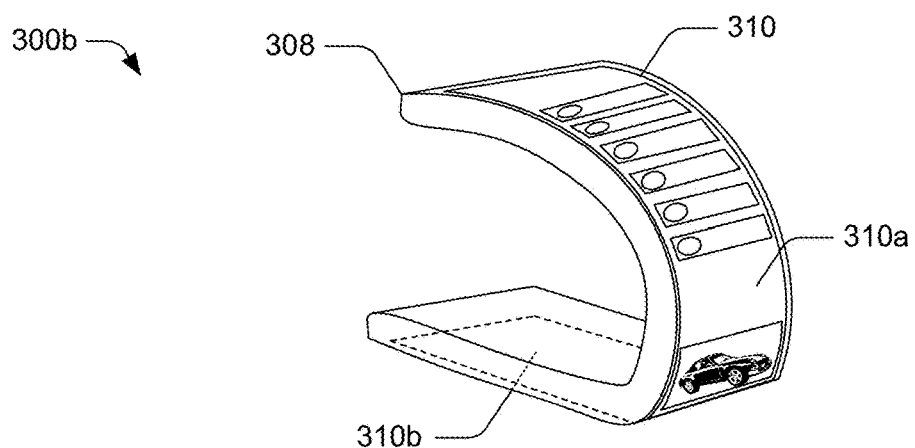
Figure 3:
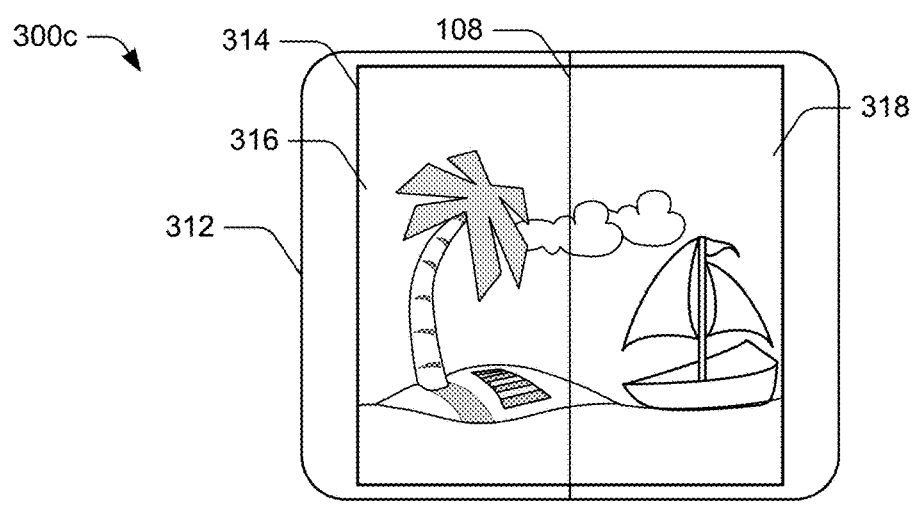

FIG. 3 depicts example implementation scenarios 300 of devices that include functionality for inference of an intended primary display of a hinged device as described herein. The scenarios 300 include various different configurations of devices having multiple touch surfaces. The devices discussed in the scenarios 300, for instance, represent different instances of the client device 102.

For example, in scenario 300a, multiple display devices 104, 106 are physically connected to one another and include touch-sensitive displays 110, 112, respectively. In implementations, the display devices 104, 106 can be connected via a movable connection 302, such as a hinge, a pivot, a joint, a swivel, and so on. The movable connection 302 can allow the display devices 104, 106 to be positioned in a variety of different postures, such as a "closed book" posture where the displays 110, 112 face each other. Additionally, the display devices 104, 106 can be positioned in an "open book" posture where the displays 110, 112 are positioned relative to one another at an angle between zero and 90 degrees, or between 90 degrees and 180 degrees. In yet another example position, the displays 110, 112 can be parallel with one another in a side-by-side configuration where both displays 110, 112 face the same direction. In at least one implementation, the display devices 104, 106 can be positioned such that the displays 110, 112 face substantially opposite directions, as illustrated in example configuration 304. According to various implementations, touch input to the displays 110, 112 can be interpreted according to techniques for inference of an intended primary display of a hinged mobile device described herein.

Scenario 300b includes a bendable device 308 having a display device 310 that is bendable into different configurations, causing at least a portion of the display device 310 to be hidden from the user's view. For example, the bendable device 308 can be shaped into a position having a first portion 310a of the display device 310 facing the user and a second portion 310b of the display device 310 that is non-planar with the first portion 310a, such that the second portion 310b of the display device 310 is essentially "on the backside" of the bendable device 308. In at least one implementation, the second portion 310b can be positioned normal to the first portion 310a. Accordingly, a variety of different positions and configurations of the bendable device 308 are contemplated, and are not necessarily limited to a front/back configuration. According to various implementations, touch input to the first portion 310a and the second portion 310b can be interpreted according to techniques for inference of an intended primary display of a hinged mobile device described herein.

Scenario 300c includes a device 312 with a single integrated display 314 that can be bent along the hinge 108. The single integrated display 314 can include multiple display portions, such as display portion 316 and display portion 318, each of which can include touch screen functionality. The display portions 316, 318 can be used to display different content, such as different application user interfaces, or the display portions 316, 318 can be used to display content via a single application user interface across both of the display portions 316, 318. In an example, display portion 318 can be designated as the primary display for presentation of an interactive application (e.g., notetaking application) while the other display portion 316 can be used to display a comparatively-less interactive application, such as a media player application. In another example, both display portions 316, 318 can be designated as the primary display, such as for playback of video content across both of the display portions 316, 318. Alternatively, a single application user interface displayed across both of the display portions 316, 318 can present user interface controls via a designated primary display, which may correspond to the user's handedness, e.g., right/left hand.

Figure 4:
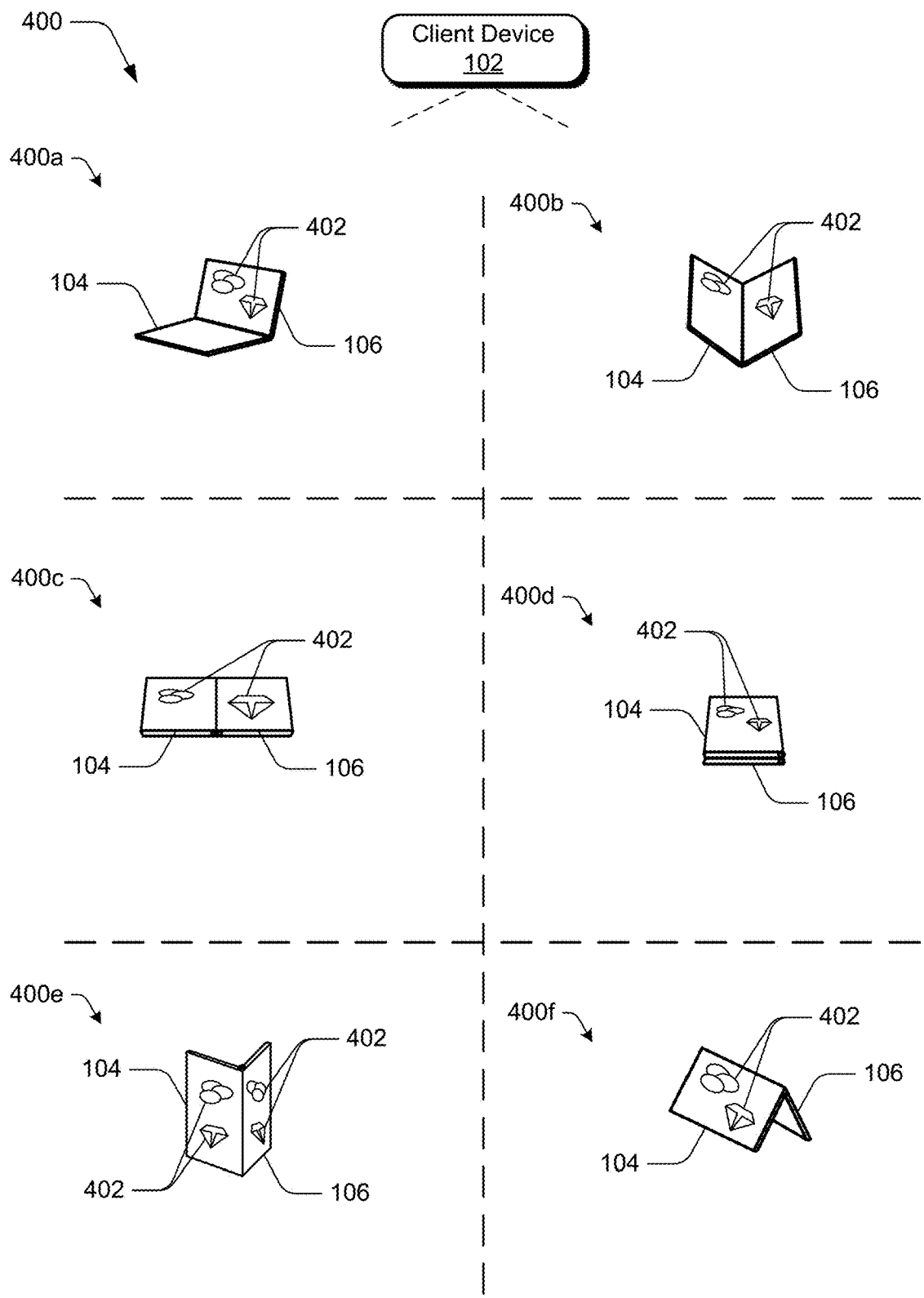
FIG. 4 depicts example implementation scenarios for postures of a hinged device in accordance with one or more embodiments.

FIG. 4 illustrates example implementation scenarios 400 for postures of a hinged device in accordance with one or more embodiments. The scenarios 400 each include an instance of the client device 102 from FIG. 1 positioned in a particular posture (e.g., position and orientation in space). For example, scenario 400a represents a "laptop" posture in which the display device 104 is resting on a surface and facing a direction opposite the surface. For instance, the client device 102 may be resting on a table, a desk, a user's lap, or any other suitable surface. The display device 106 is facing toward a user using the client device 102 in a landscape orientation. A hinge angle is formed between the display device 104 and the display device 106, such as between 60 and 160 degrees. In at least some implementations, although the user may be able to view display device 104, the display device 106 can act as the primary display to display content 402 and the display device 104 can be turned off or placed in a low power state (e.g., sleep, hibernation).

Scenario 400b represents the client device 102 in a "book" posture, in which the client device 102 is held similar to a paper book. In Scenario 400b, the client device 102 is positioned in a portrait orientation with both display devices 104, 106 being viewable by the user, but oriented toward each other such that the hinge angle formed between the display devices 104, 106 is between 60 degrees and 180 degrees. Here, one or both of the display devices 104, 106 can be designated as the primary display to display the content 402.

Scenario 400c includes the client device 102 in a "flat" posture, such that display devices 104, 106 face substantially the same direction and the hinge angle formed between the display devices 104, 106 is approximately 180 degrees. Here, either one of the display devices 104, 106, or both, can be used to display the content 402 and either one of the display devices 104, 106 can be designated as the primary display.

Scenario 400d illustrates the client device 102 in a "flipped" posture in which the display devices 104, 106 are facing opposite directions. The hinge 108 has been bent to "flip" the display device 106 around behind the display device 104. In this scenario 400d, the display device 104 is viewable by the user, but the display device 106 is not viewable by the user because the display device 106 faces away from the user. Accordingly, the display device 104 is being used as the primary display. Further, the client device 102 can be held in either a portrait or a landscape orientation to enable the user to view the content 402 displayed via the display device 104. In at least some implementations, the display device 106 may be placed in a low power state or turned off.

Alternatively, the user can turn the client device 102 around to view the display device 106. Doing so may cause the display device 104 to face away from the user such that the user may no longer be able to view the display device 104. In this case, the display device 106 can be designated as the primary display to display the content 402, and the display device 104 can be transitioned into the low power state.

Scenario 400e illustrates a "corner" posture in which the client device 102 is placed upright in the portrait orientation with the display devices 104, 106 facing outward on different sides of a corner that is formed between the display devices 104, 106. Here, the angle formed between the display device 104, 106 may be between 250 degrees and 360 degrees to allow different users to view the different display devices 104, 106. This posture may be useful when displaying content (e.g., in a presentation) for a small group of people that cannot all view the content via a single display device. This posture allows some of the crowd to move to the side of the client device 102 to view the same or different content on the display device 106. The corner posture is essentially opposite the book posture since the display devices 104, 106 face outward rather than inward. In the corner posture, one of the display devices 104, 106 can be designated as the primary display. For example, display device 104 can be designated as the primary display to display user interface controls for controlling the presentation being displayed via display device 106.

Scenario 400f represents a "tent" posture in which the client device 102 is placed in a landscape orientation with the display devices 104, 106 facing outward. Here, the client device 102 is positioned to allow each of the display devices 104, 106 to be viewed by different users. For example, a first user may view the display device 104 and a second user (sitting across from the first user) may view the display device 106. Accordingly, the tent posture can allow multiplayer applications to be played by multiple users on a single device, without allowing the users to view the other user's screen. Other postures can also allow for similar functionality.

In at least one implementation, user interface controls can be treated differently on the different display devices. For example, while both users have their own view of a multiplayer game, a primary display can still be designated for the primary user. In this example, the display device 104 facing the primary user may include additional controls that allow the user to control administrative tasks for the game (e.g., save, load, change settings), and the opposing display device 106 may include various controls for gameplay but not for the administrative tasks. Accordingly, the primary display can be designated even when both display devices 104, 106 are used simultaneously for displaying content.

Accordingly, any of a variety of different postures can be utilized to display content via a device with multiple display devices connected together by a hinge. Depending on the posture, the display may be adjusted to suit the manner in which the client device 102 is being used or is intended to be used by the user. Further, a change from one posture to another posture can trigger a change in the primary display. For example, a change in the hinge angle of the hinge 108 between the display devices 104, 106 can trigger a change in the primary display if the change in the hinge angle is greater than a threshold value, e.g., 10 degrees, 15 degrees, 30 degrees, and so on. Any suitable threshold value can be utilized for the change in the hinge angle to trigger a change in the primary display. In implementations, a physical displacement, rather than a hinge angle change, can trigger a change in the primary display. For example, the physical displacement can include a posture change from the laptop posture in scenario 400a to the book posture in the scenario 400b, where the hinge angle remains substantially the same but the orientation of the client device 102 is rotated from a landscape orientation to a portrait orientation. The techniques described herein infer the user's intended primary display based on physical movement (e.g., physical displacement, change in the hinge angle) of the client device 102 in order to automatically present the content to the user in the manner desired by the user.

Figure 5:
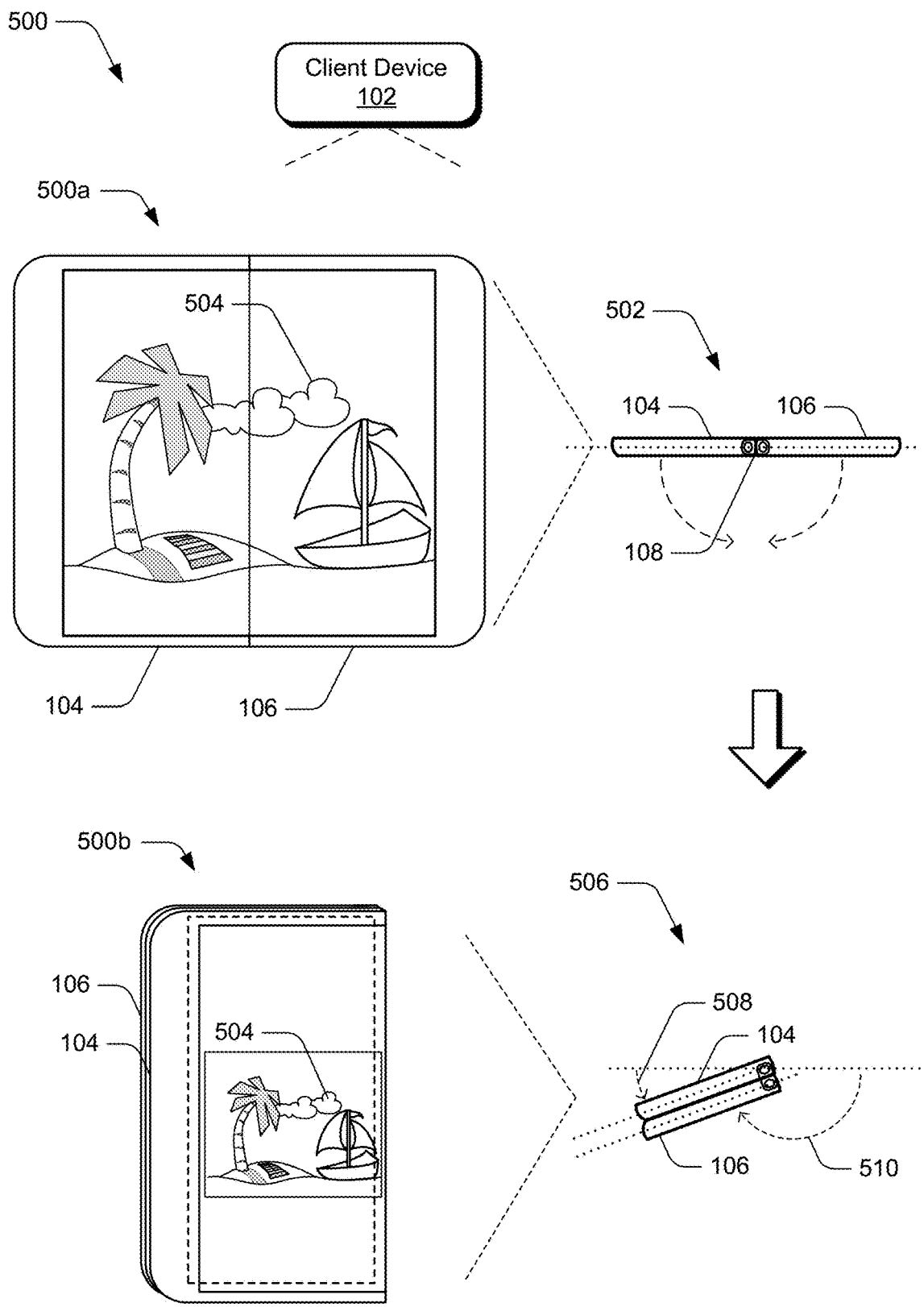
FIG. 5 depicts an example implementation scenario for inference of an intended primary display of a hinged mobile device in accordance with one or more embodiments.

FIG. 5 depicts an example implementation scenario 500 for inference of an intended primary display of a hinged mobile device in accordance with one or more embodiments. In scenario 500a, the client device 102 is positioned in a flat posture 502 such that both display devices 104, 106 are facing the same direction. In this flat posture 502, image 504 is displayed across both display devices 104, 106. The user then bends the hinge 108 and physically moves one or both of the display devices 104, 106, such as by transitioning the client device 102 from the flat posture 502 to a flipped posture 506. The sensors 132 detect the physical movement (e.g., displacement) of the display devices 104, 106. Here, the display device 104 is displaced by an amount 508 and the display device 106 is displaced by an amount 510. In implementations, the display device with the least amount of physical displacement in comparison to the other display device can be inferred to be the intended primary display. In the flipped posture 506, the display device 104 is facing toward the user but the user can no longer see the display device 106 because the display device 106 is now on the reverse side of the client device 102 and facing away from the user. Here, it is detected that the display device 106 had a greater physical displacement in comparison to the displacement of the display device 104. Based on this information, the system can infer that the display device 104 is intended to be the primary display since the display device 106 was moved to the reverse side of the client device 102. Accordingly, the image 504 is resized to be displayed via the display device 104 and the display device 106 is turned off or placed in a low power state.

Figure 6:
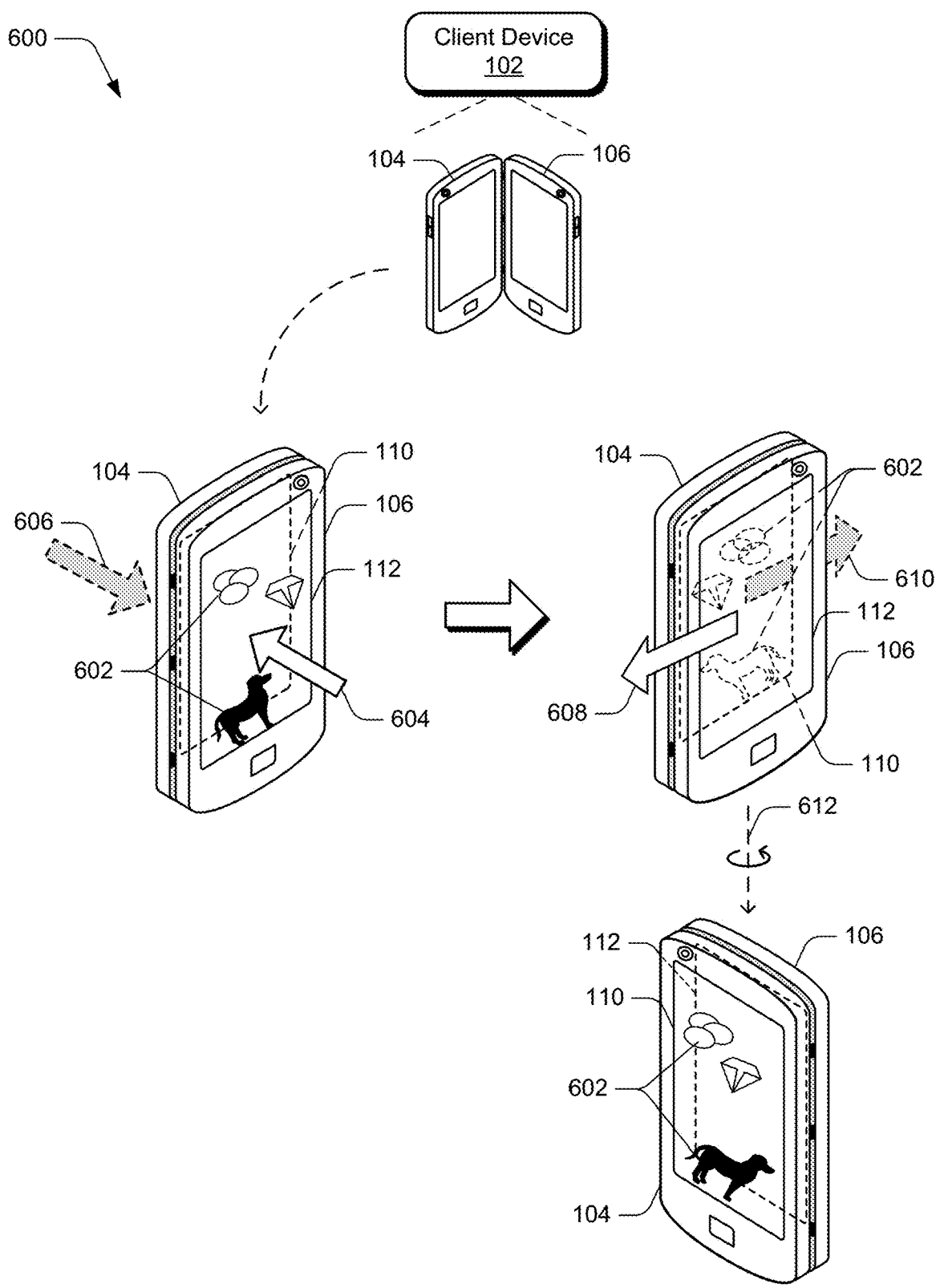
FIG. 6 depicts an example implementation scenario which represents a flip gesture to switch displays in accordance with one or more embodiments.

FIG. 6 depicts an example implementation scenario 600 which represents a flip gesture to switch displays in accordance with one or more embodiments. In the scenario 600, the client device 102 is positioned in the flipped posture and content 602 is displayed via display device 104 while display device 106 is turned off. In order to easily switch displays, the user can perform a non-aligned dual-surface gesture, which can be referred to as a "coin flip" because it is similar to flipping a coin to view content on the reverse side. For example, non-aligned dual-surface gestures can begin with simultaneous correlated touch points on both the touch surface 110 and the touch surface 112, and then continue with non-aligned gesture movement on one or both surfaces. For instance, in at least one implementation, a user pinches the client device 102 with substantially simultaneous touch inputs 604, 606, and then moves the touch inputs 604, 606 in opposite directions on each surface. For example, gesture movement can include moving the touch input 604 on the display touch surface 112 to the left while moving the touch input 606 on the touch surface 110 to the right, as illustrated by arrows 608, 610, respectively. These two gestures can cause the system to switch the primary display from the display device 106 to the display device 104. Then, if the client device 102 is rotated around a longitudinal axis 612, the content 602 can be viewed via the display device 104. In this way, if the user is using the client device 102 in the flipped posture and viewing content via display device 106, the user can easily switch the displays to allow another person to view the content via the display device 104 without having to turn the client device 102 over.

Figure 7:
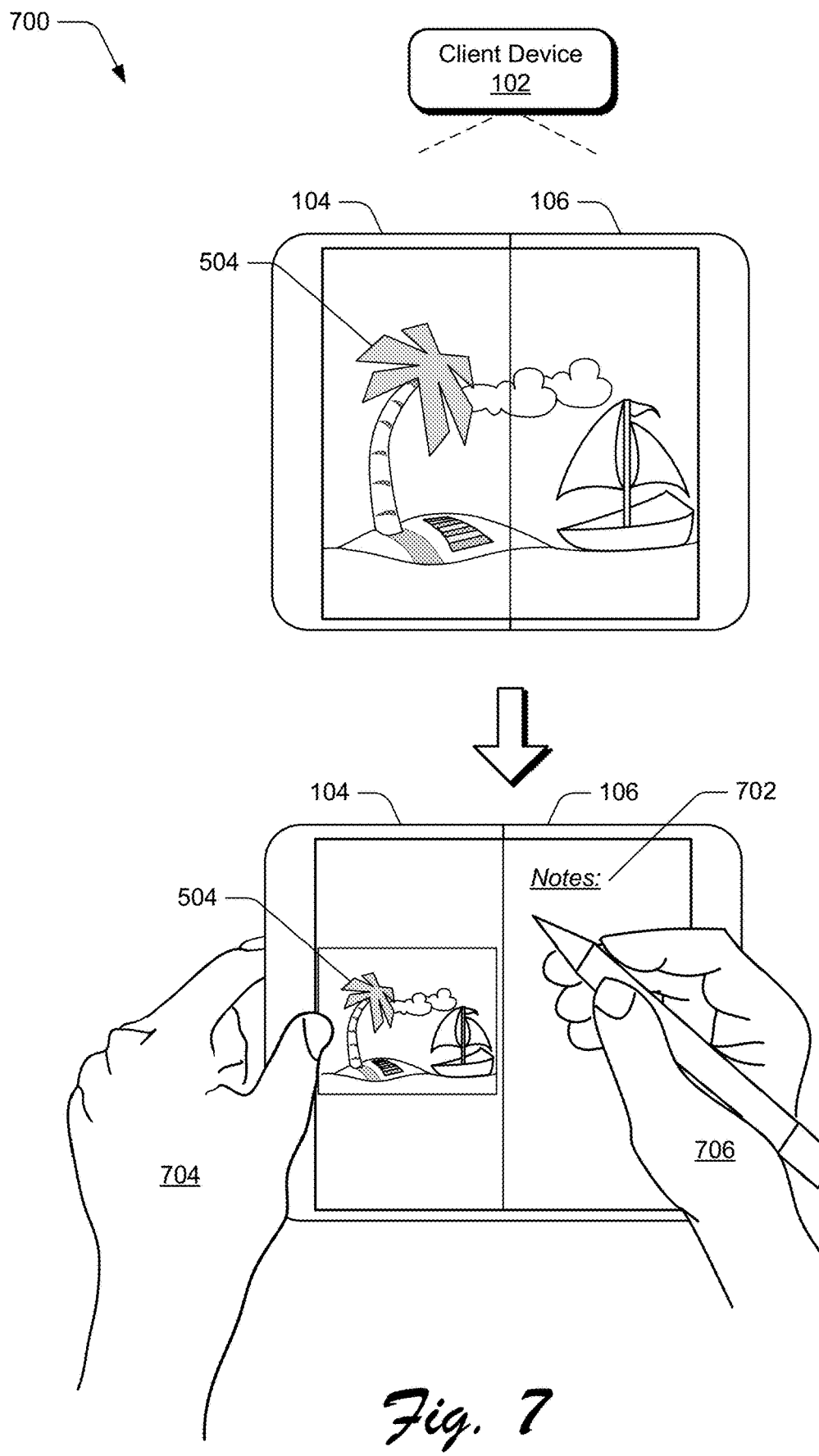
FIG. 7 depicts an example implementation scenario for inference of an intended primary display of a hinged mobile device in accordance with one or more embodiments.

FIG. 7 depicts an example implementation scenario 700 for inference of an intended primary display of a hinged mobile device in accordance with one or more embodiments. In the scenario 700, the client device 102 is being used to display the image 504 via both the display devices 104, 106 as a single integrated display. Without changing postures of the client device 102, the user launches a notetaking application 702. Based on a variety of sensor signals and context information, the system can infer that the display device 106 is intended by the user to be used as the primary display for the notetaking application 702.

For example, by detecting the user's left hand 704 grasping the client device 102, the system can identify the user, based on hand size and/or shape, and can determine that the user is right handed based on known attributes of the user obtained via the user settings 220 or the behavioral data 216, or both. Alternatively or in addition, because the user is grasping the client device 102 with the left hand 704, the system can infer that the user is intending to write notes with a right hand 706 because generally users do not grasp the client device 102 with a dominant writing hand. In addition to knowing that the user is right handed, the system can use the behavioral data to determine that the user has a history of using the notetaking application 702 and/or similar types of applications (e.g., based on classification, user interface controls, functionalities, and/or content of the applications) on the right side via display device 106. This may be because the user can write with the right hand without obscuring the other display device (display device 104). Accordingly, the client device 102 can utilize a variety of sensors 132 and context information 208 to infer that the user's intended primary display is the display device 106. Using this information, the client device 102 can then move and resize the display of the image 504 to display the image 504 only via the display device 104 (e.g., left side), and launch the notetaking application 702 via the inferred primary display, e.g., the display device 106 on the right side.

Figure 8:
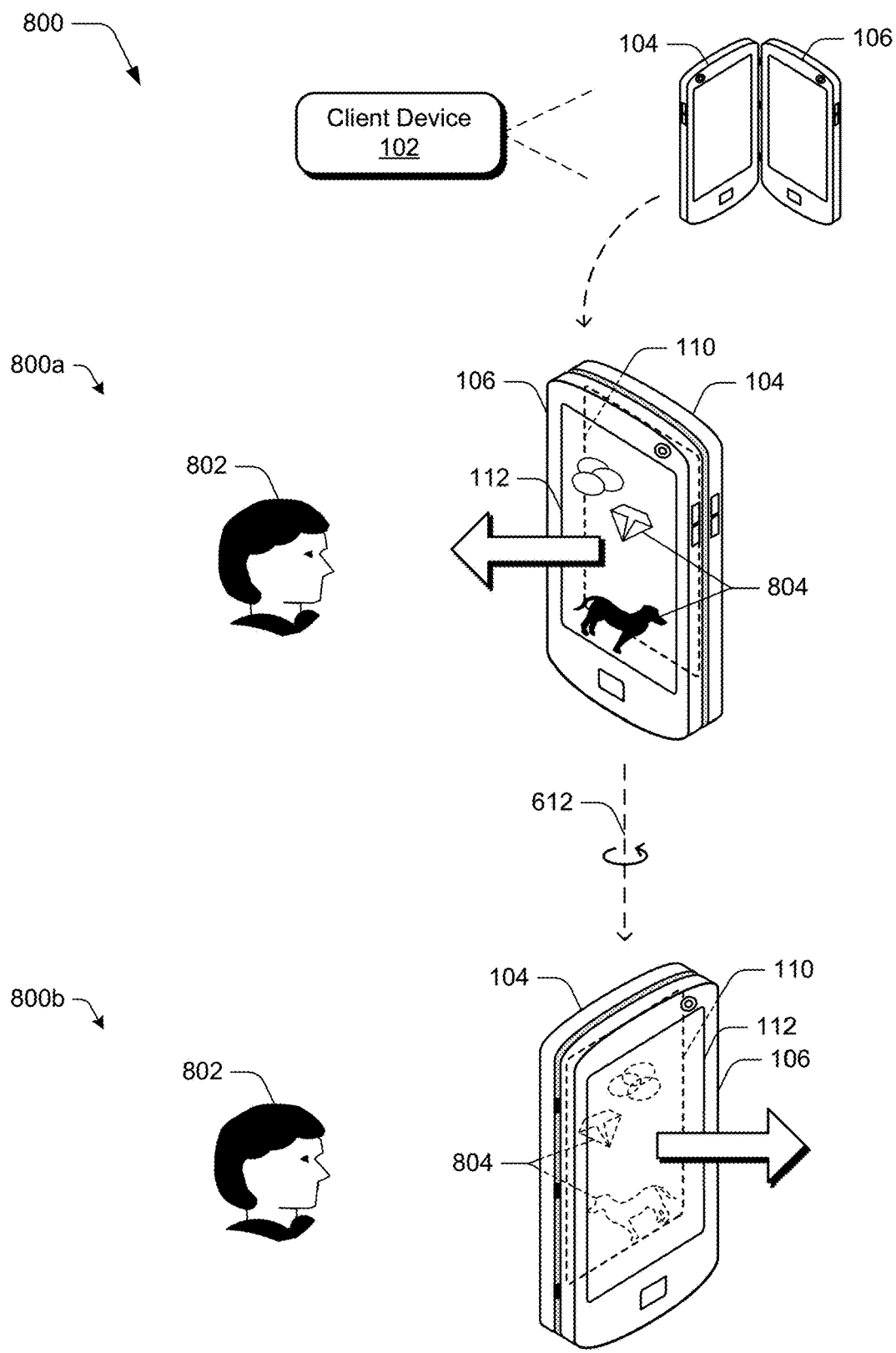
FIG. 8 depicts an example implementation scenario for inference of an intended primary display of a hinged mobile device in accordance with one or more embodiments.

FIG. 8 depicts an example implementation scenario 800 for inference of an intended primary display of a hinged mobile device in accordance with one or more embodiments. In the scenario 800, a user 802 is viewing the client device 102 in the flipped posture, such that the display device 106 is facing the user 802 but the display device 104 is facing away from the user 802 and the user 802 cannot see the display device 104. In the scenario 700a, content 804 is displayed for the user via the display device 106. In implementations, the user 802 can turn the device around a longitudinal axis 612 of the client device 102 to view the opposite side, e.g., the display device 104 that was previously facing away from the user 802. When the user 802 turns the device in this manner, the sensors 132 from FIG. 1 can detect the physical movement of the client device 102, and the client device 102 can determine that it has been turned around. Using context information, such as grip information, captured images/video, or proximity signals, the client device 102 can infer that the primary display is intended to switch to the display device 104, which is the side now facing the user 802.

Figure 9:
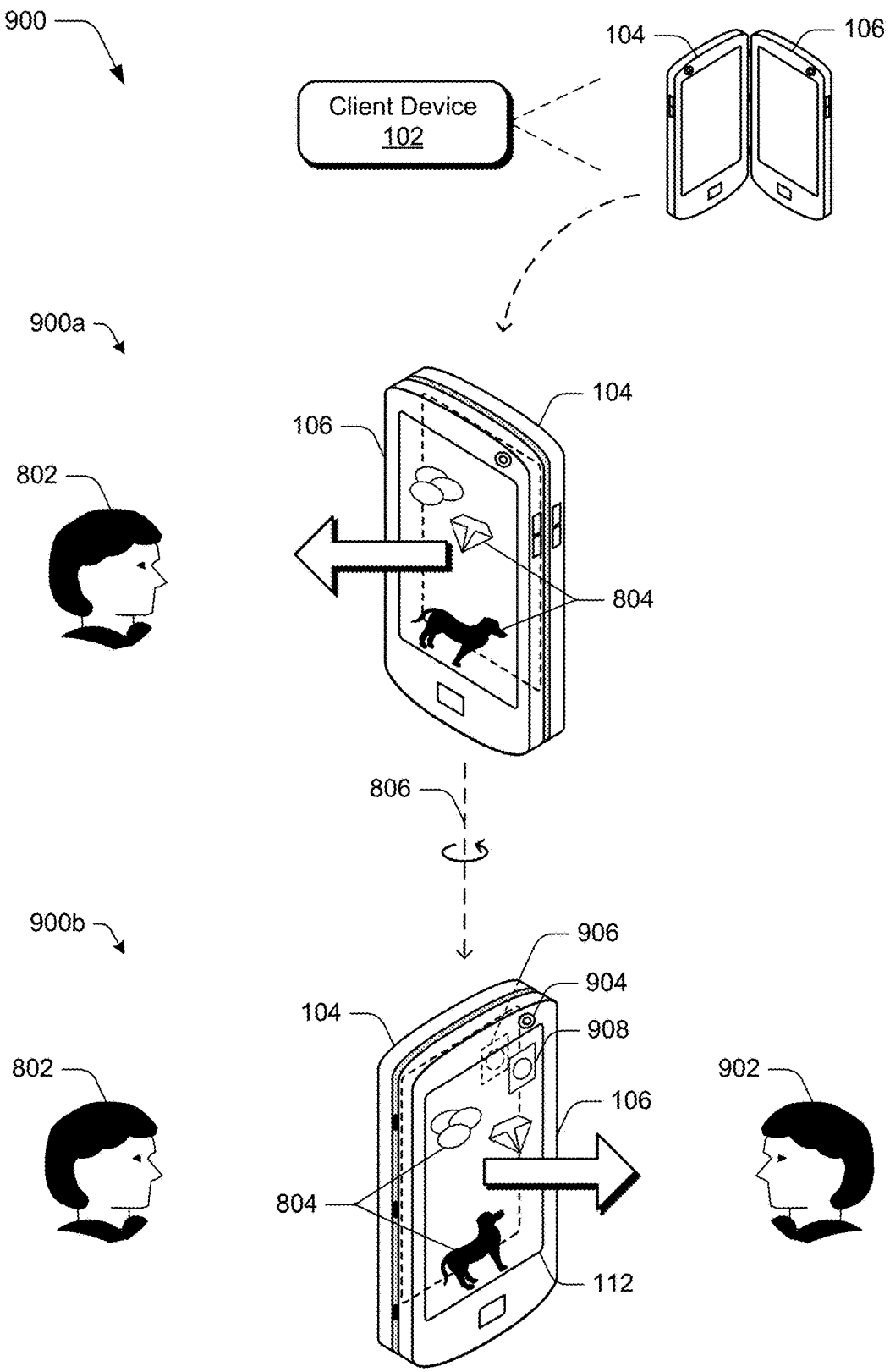
FIG. 9 depicts an example implementation scenario for inference of an intended primary display of a hinged mobile device in accordance with one or more embodiments.

FIG. 9 depicts an example implementation scenario 900 for inference of an intended primary display of a hinged mobile device in accordance with one or more embodiments. In the scenario 900a, the client device 102 is being used in the flipped posture and the content 804 is being presented via the display device 106, which is facing the user 802. Assume the user 802 then turns the device around the longitudinal axis 612 to show the displayed content 804 to another person 902, as illustrated in scenario 900b. The client device 102 detects the physical movement of the client device 102 to infer which display device to use as the primary display.

In some implementations, the system may incorrectly infer the user's intended primary display, such as by inferring the primary display to be display device 104, which is now facing the user 802 in scenario 900b. In this example, however, the user intended the primary display to remain the same when the user turned the device around to allow the other person 902 to view the displayed content 804. To avoid this error, the system can use the context information to determine that the display device 104 is to remain the primary display. This can involve interaction between the verification module 136 and the inference module 134. In an example, the context information obtained by the verification module 136 can include grip information indicating a particular way the user is grasping the device (e.g., the user's hand is obscuring a portion of the display device 106), visual data detected via a camera 904 that indicates the other person 902 facing the display device 106, proximity data indicating that the other person 902 is proximate to the display device 106, and so on. The verification module 136 is configured to verify whether the inference module 134 likely inferred the primary display correctly, and override the inference if the inferred primary display is determined to likely be incorrect based on the context information. In addition, the verification module 136 is configured to, based on detection of an inference error, update weightings used by the inference module 134 to improve future inferences. Accordingly, the context information 208 is used to reduce errors in the inferences made by the system and more accurately infer the user's intended primary display.

In addition or alternatively, an indication of which display is to be designated as the primary display can be provided to the user. In this way, the user can be informed of whether the client device 102 is correctly inferring the intended primary display. In an example, a visual indicator 906 can be displayed via display device 104, or a visual indicator 908 can be displayed via display device 106. Either one of the visual indicators 906, 908, or both, can be displayed to inform the user of which display device (e.g., display device 104 or display device 106) is to be the primary display. In at least one implementation, a light emitting diode (LED) or other light can turn on, flash, or emit a particular color to indicate the primary display.

Further, a user-selectable option to override the determination of which display device is to be the primary display is provided. The user-selectable option (e.g., visual indicator 906) enables the user to easily override the automated inference of the primary display. In an example, the user may turn the client device 102 about the longitudinal axis 612 to view the reverse side. Based on detection of the other person 902, the client device 102 infers that the primary display is to remain the display device 106. However, the user 802 can select the visual indicator 906 to cause the client device 102 to switch the primary display to the display device 104.

In at least one implementation, if the client device 102 switches the primary display to the display device 104 when the user turns the client device 102 about the longitudinal axis 612 but the user 802 desires the primary display to switch instead to the display device 106, the user 802 can enter an input, such as a touch input (e.g., tap, double tap, swipe, press and hold) via the touch surface 112 of the display device 106. In this example, this touch input overrides the inference and selects the display device 106 as the primary display. Accordingly, a variety of user-selectable options can be provided to allow the user 802 to selectively override the determination of which display device is the primary display. Based on this explicit override input by the user, the verification module 136 can update weightings used by the inference module 134 to improve future inferences.

Having described some example implementation scenarios, consider now some example procedures for inference of an intended primary display of a hinged mobile device in accordance with one or more implementations.

Example Procedures

The following discussion describes example procedures for inference of an intended primary display of a hinged mobile device in accordance with one or more embodiments. The example procedures may be employed in the environment 100 of FIG. 1, the system 1200 of FIG. 12, and/or any other suitable environment. The procedures, for instance, represent procedures for implementing the example implementation scenarios discussed above. In at least some implementations, the steps described for the various procedures can be implemented automatically and independent of user interaction, such as by the inference module 134 and the verification module 136. Further, the steps described below in FIGS. 10 and 11 can be performed in any suitable combination and/or order, and are not intended to be construed as limited to the orders described.

Figure 10:
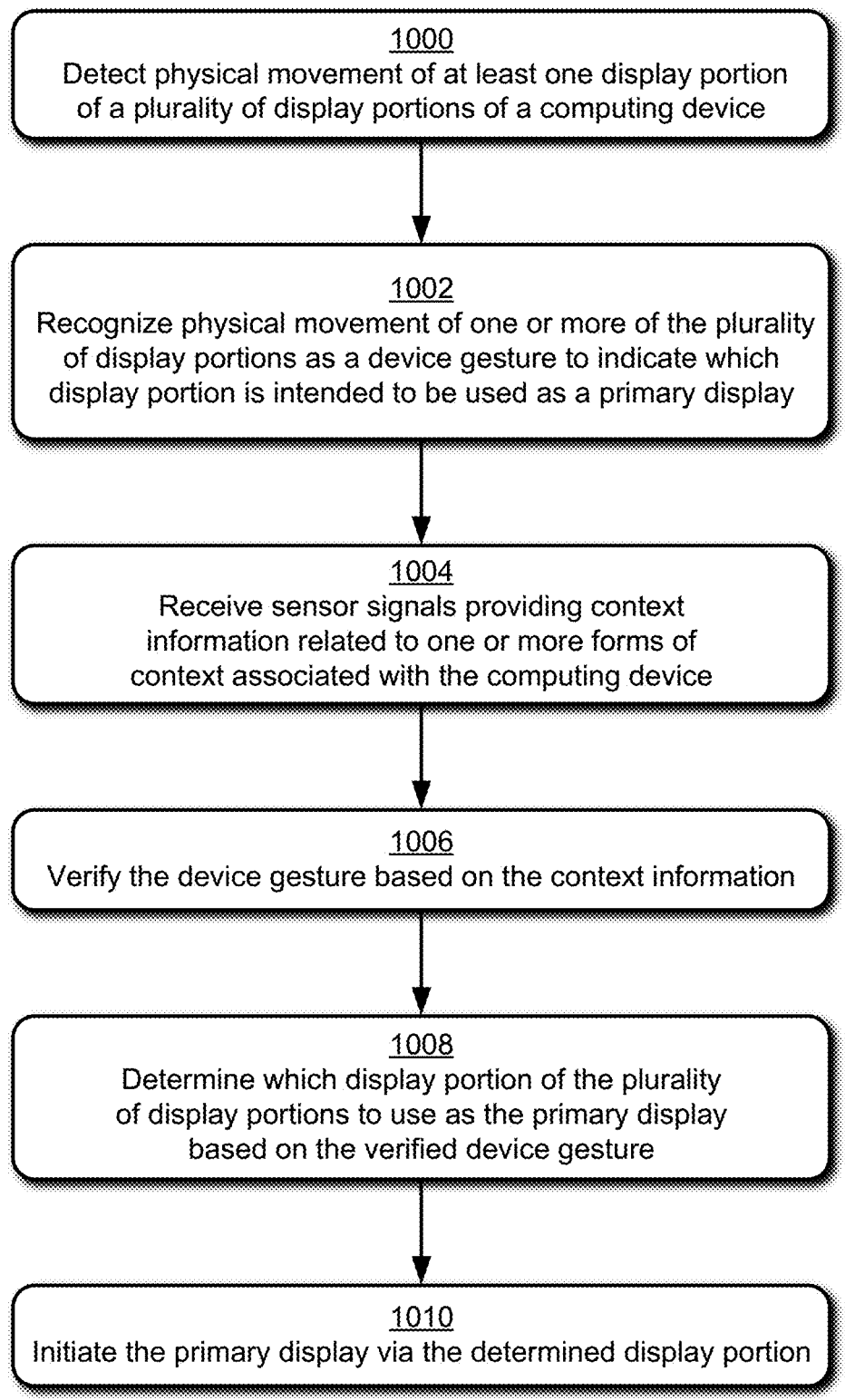
FIG. 10 is a flow diagram that describes steps in a method for inferring an intended primary display of a hinged mobile device in accordance with one or more implementations.

FIG. 10 is a flow diagram that describes steps in a method for inferring a user's intended primary display of a hinged mobile device in accordance with one or more implementations. The method, for instance, describes an example procedure for inferring which of a plurality of display devices the user intends to use as the primary display.

Step 1000 detects physical movement of one or more of a plurality of display portions of a computing device. The physical movement is detected by sensors associated with the computing device, examples of which are described above with respect to FIGS. 1 and 2. In an example implementation, the plurality of display portions includes a first display portion connected to a second display portion by a hinge. In at least one implementation, the physical movement is a change in posture of the mobile device, where a hinge angle of a hinge between the display portions is changed. In some implementations, the physical movement is rotation around an axis, such as a longitudinal axis or a lateral axis. In another example, the physical movement includes displacement in space, such as a change in altitude. Generally, physical movement may include any one or combination of these or other types of movement.

Step 1002 recognizes the physical movement of the one or more of a plurality of display portions as a base input signal to indicate which display portion is intended to be used as a primary display. In an example implementation, the base input signal can indicate an orientation of the client device in space and a position of each display device relative to one another. Examples of the base input signal are described above in relation to FIG. 2.

Step 1004 receives sensor signals providing context information related to one or more forms of context associated with the computing device. In implementations, the context information indicates various types of information usable to more accurately infer how the user intends to use the computing device. Examples of the context information are described above in relation to FIG. 2.

Step 1006 verifies the base input signal based on the context information. For example, the context information can be used to verify that the base input signal was not an accidental input, but was an intentional input intended to initiate an operation. An example of this is described above with respect to scenario 900 of FIG. 9, in which the user 802 turns the client device 102 around to show displayed content 804 to the other person 902. Using the context information that indicates the way the user is grasping the client device 102 and identifies the presence of the other person 902, the client device 102 can verify that the turning of the client device 102 was not intended to be an input that switches the primary display.

Step 1008 determines which display portion of the plurality of display portions to use as the primary display based on the verified base input signal. Examples of this step are described above, such as with respect to scenarios 500, 700, 800, and 900 of FIGS. 5 and 7-9, respectively.

Step 1010 initiates the primary display via the determined display portion. This step can be performed in any suitable way, such as by causing content to be displayed via a particular display portion. Examples of this step are described above with respect to FIGS. 4-9. Further, in combination with steps 1000-1008, a user-selectable option can be provided that is selectable to override the determination of the primary display, which provides additional control to the user. An example of this is described below with respect to FIG. 11.

Figure 11:
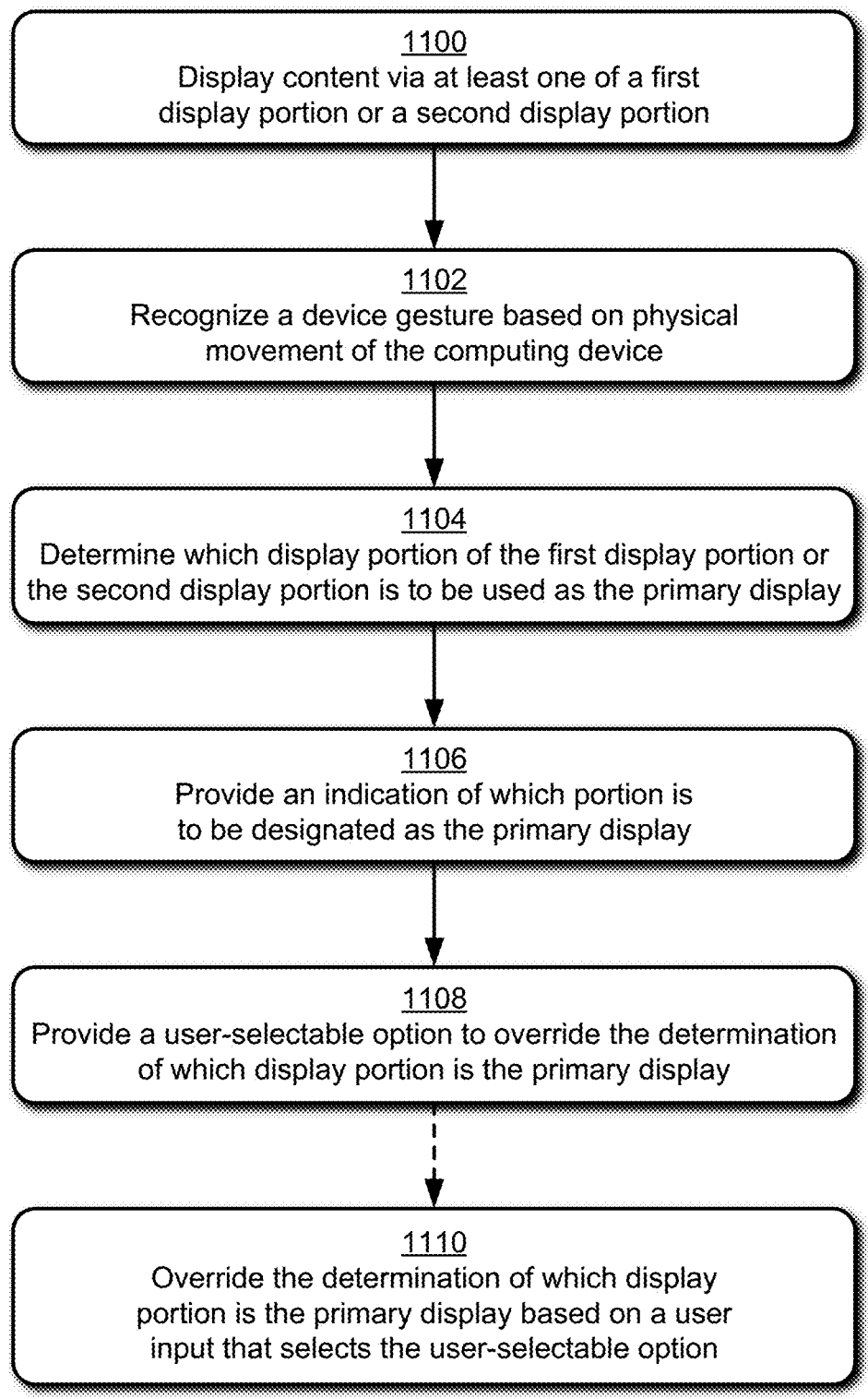
FIG. 11 is a flow diagram that describes steps in a method for inferring an intended primary display of a hinged mobile device in accordance with one or more implementations.

FIG. 11 is a flow diagram that describes steps in a method for inferring a user's intended primary display of a hinged mobile device in accordance with one or more implementations. The method, for instance, describes an example procedure for providing an option to override an inference of an intended primary display.

Step 1100 displays content via at least one of a first display portion or a second display portion. The client device 102, for instance, includes two display devices 104,

106 that are connected by a hinge 108. In addition, the first display portion may currently be employed as the primary display.

Step 1102 recognizes a device gesture based on physical movement of the computing device. For example, the client device 102 can determine that the posture of the client device 102 has changed to a different posture, such as from an open posture to a flipped posture, as described with respect to the scenario 500 in FIG. 5.

Step 1104 determines which display portion of the first display portion or the second display portion is to be used as the primary display. The client device 102, for example, infers the user's intended primary display based on the device gesture and context information.

Step 1106 provides an indication of which portion is to be designated as the primary display. For example, the client device 102 can prompt the user with a visual indication, such as a displayed notification, indicating that the primary display is to be switched, or identifying a particular display device that is to be designated as the primary display.

Step 1108 provides a user-selectable option to override the determination of which display portion is the primary display. The client device 102, for example, can display the user-selectable option via either or both of the display devices 104, 106 to provide the user the option of correcting or otherwise overriding the inferred primary display.

Step 1110 overrides the determination of which display portion is the primary display based on a user input that selects the user-selectable option. In this way, the user can correct any undesired inferences made by the system regarding the user's intended primary display, or switch the primary display after having performed an unintentional device gesture.

Having described some example procedures for inference of an intended primary display of a hinged mobile device, consider now some further implementation details in accordance with one or more implementations.

Implementation Details

Generally, techniques for inference of an intended primary display on a hinged mobile device described herein enable:

Automatic designation of a primary display on a hinged device

Automatic inference of a user's intended primary display based on physical movement of the hinged device Automatic power conservation by changing a power state of a non-primary display to a low-power state, based on the inference of the user's intended primary display An ability to anticipate the user's intended primary display based on context information More accurate inferences of the user's intended primary display based on the context information, when compared to conventional techniques Accurate inferences of the user's intended primary display based on verification of device gestures and implicit gestures Accordingly, techniques described herein provide more efficient control of display devices of a hinged device. Additionally, the techniques described herein improve the user experience by displaying content on the most convenient display device. Further, the user experience is improved by automatically inferring the user's intended primary display based on physical movement of the client device or execution of a particular application. Accordingly, such implementations increase efficiency and reduce power consumption, thus conserving battery life of the client device.

Having described some example implementation details, consider now a discussion of an example system and device in accordance with one or more implementations.

Example System and Device

Figure 12:
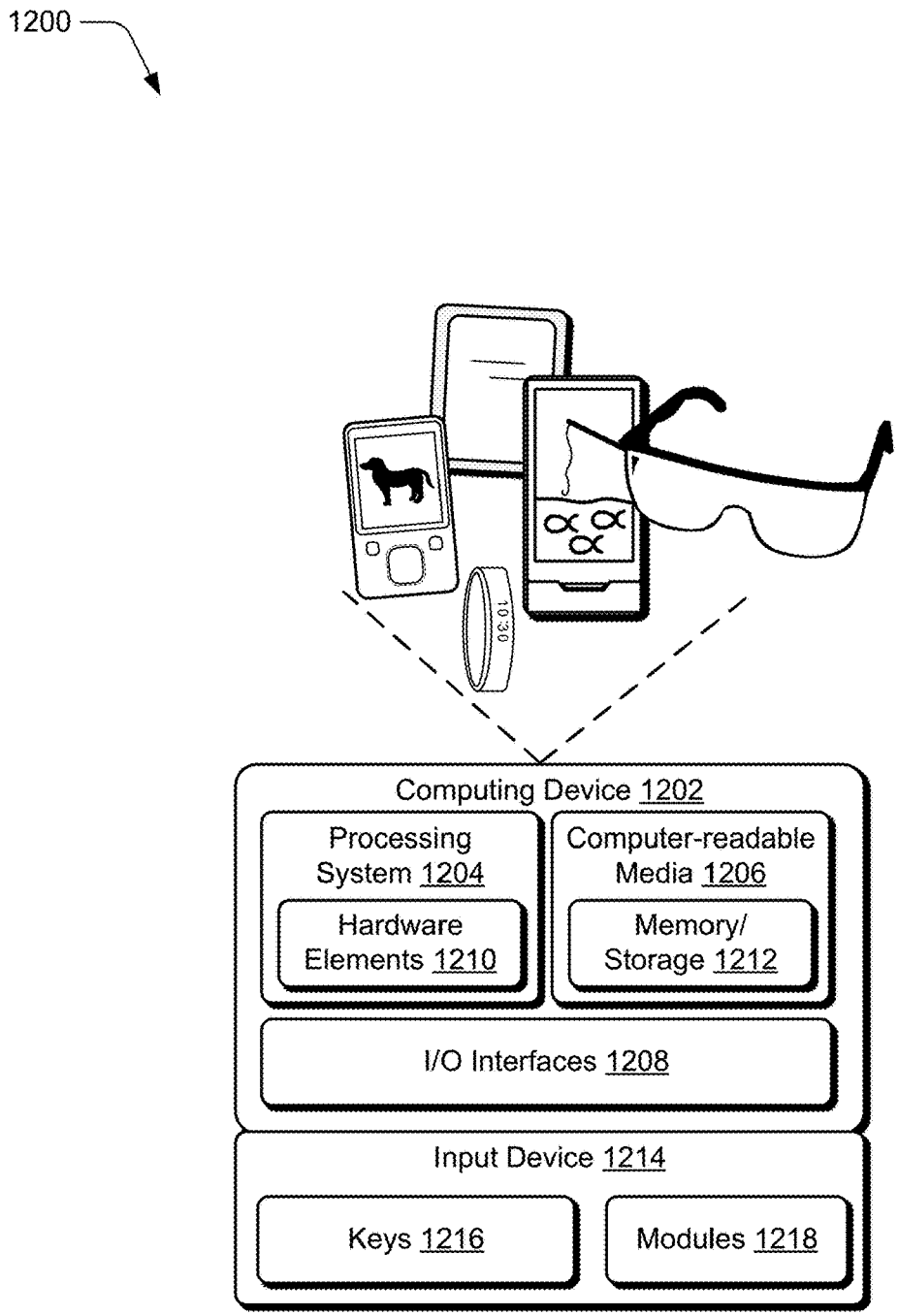
FIG. 12 illustrates an example system including various components of an example device that can be implemented as any type of computing device as described with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. In at least some implementations, the computing device 1202 represents an implementation of the client device 102 discussed above. The computing device 1202 may, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the client device 102 may be implemented as a wearable device, such as a smart watch, smart glasses, a dual-surface gesture-input peripheral for a computing device, and so forth.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways to support user interaction.

The computing device 1202 is further illustrated as being communicatively and physically coupled to an input device 1214 that is physically and communicatively removable from the computing device 1202. In this way, a variety of different input devices may be coupled to the computing device 1202 having a wide variety of configurations to support a wide variety of functionality. In this example, the input device 1214 includes one or more keys 1216, which may be configured as pressure sensitive keys, mechanically switched keys, and so forth.

The input device 1214 is further illustrated as include one or more modules 1218 that may be configured to support a variety of functionality. The one or more modules 1218, for instance, may be configured to process analog and/or digital signals received from the keys 1216 to determine whether a keystroke was intended, determine whether an input is indicative of resting pressure, support authentication of the input device 1214 for operation with the computing device 1202, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media and does not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system to infer an intended primary display of a computing device with multiple displays based on movement of the computing device, the system comprising: a device having a plurality of display portions physically connected to each other by a hinge; a plurality of sensors disposed on each of the plurality of display portions; at least one processor; and at least one computer-readable storage media storing instructions that are executable by the at least one processor to perform operations including: detecting, by sensors associated with the computing device, physical movement of at least one display portion of a plurality of display portions, the plurality of display portions including a first display portion connected to a second display portion by a hinge; recognizing the physical movement as an input signal to indicate which of the plurality of display portions is intended to be used as a primary display; determining that the first display portion is likely intended to be used as the primary display based on the input signal; and initiate the primary display via the first display portion.

In addition to any of the above described systems, any one or combination of: wherein said determining includes detecting a greater physical displacement of the second display portion in comparison to a physical displacement of the first display portion; wherein the first display portion and the second display portion are facing opposite directions, prior to the detecting, the second display portion is facing a user of the computing device and is currently used as the primary display, and the physical movement includes flipping the computing device over to cause the first display portion to face the user; wherein the first display portion and the second display portion are facing opposite directions, prior to the detecting, the first display portion is facing a user of the computing device and is currently used as the primary display, and the physical movement includes turning the computing device to cause the first display portion to face another user; wherein the physical movement includes transitioning the computing device from a closed posture to an open posture; wherein the physical movement includes transitioning the computing device from one of a closed posture or an open posture to a flipped posture in which the first display portion and the second display portion are facing away from each other in opposite directions; wherein the physical movement includes a hinge angle of the hinge being changed by an amount greater than a threshold value; wherein the physical movement includes the computing device being lifted from a stationary location; and wherein the sensors are disposed on each display device of the plurality of display devices, and the sensors include at least one of motion sensors or orientation sensors.

A method implemented by a computing device for inferring an intended primary display of multiple displays based on movement of the computing device, the method comprising: recognizing physical movement of one or more of a plurality of display portions as a device gesture to indicate which display portion is intended to be used as a primary display; receiving, from the plurality of sensors, sensor signals providing context information related to one or more forms of context associated with the computing device; verifying the device gesture based on the context information; determining which display portion of the plurality of display portions to use as the primary display based on the verified device gesture; and initiating the primary display via the determined display portion.

In addition to any of the above described methods, any one or combination of: wherein the physical movement transitions the computing device from a first posture to a second posture; wherein the physical movement changes an orientation of the computing device from a first orientation to a second orientation; wherein the plurality of sensors include grip sensors that detect which hand a user is using to grasp the computing device; and wherein the sensors include at least one of a camera, proximity sensors, hall effect sensors, magnetometers, microphones, or grip sensors.

A method implemented by a computing device for inferring an intended primary display of multiple displays based on movement of the computing device, the method comprising: displaying content via at least one of a first display portion or a second display portion, the first display portion connected to the second display portion via a hinge, the first display portion being used as a primary display; recognizing a device gesture based on physical movement of the computing device; determining which display portion of the first display portion or the second display portion is to be used as the primary display; providing an indication of which portion is to be designated as the primary display; and providing a user-selectable option to override the determination of which display portion is the primary display.

In addition to any of the above described methods, any one or combination of: wherein providing the indication includes providing a visual indication via the primary display; further comprising overriding the determination of which display portion is the primary display based on a user input that selects the user-selectable option; wherein the device gesture includes turning the computing device around effective to cause the first display portion to face away from user of the computing device, and the determining includes determining that the first display portion is to continue being used as the primary display; wherein the device gesture includes turning the computing device around effective to cause the first display portion to face away from user of the computing device, and the determining includes determining that the second display portion is to be used as the primary display; and wherein the determining includes detecting an amount of physical displacement of each of the first display portion and the second display portion, and the determining is based on a least amount of physical displacement between the first display portion and the second display portion.

CONCLUSION

Techniques for inference of an intended primary display of a hinged mobile device are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A system comprising:
   a device having a plurality of display portions physically connected to each other by a hinge;
   a plurality of sensors disposed on each of the plurality of display portions;
   at least one processor; and
   at least one computer-readable storage media storing instructions that are executable by the at least one processor to perform operations including:
     detecting, by one or more sensors associated with the computing device, physical movement of at least one display portion of a plurality of display portions, the plurality of display portions including a first display portion connected to a second display portion by the hinge;
     recognizing the physical movement as an input signal to indicate that the first display portion is intended to be used as a primary display;
     detecting, from the one or more sensors, context information related to the grip of the user during the physical movement of the at least one display portion;

analyzing the context information related to the grip of the user to determine an identity of the user;

analyzing attribute data related to the grip of the user from stored identity data of the user identified based on the identity of the user;

validating a recognition that the first display portion is likely intended to be used as the primary display based on an evaluation of the context information related to the grip of the user relative to the attribute data related to the grip of the user from the stored identity data of the user; and initiating one of the first display portion and the second display portion as the primary display based on a result of the validating of the recognition that the first display portion is likely intended to be used as the primary display.

2. A system as described in claim 1, wherein:
the first display portion and the second display portion are facing opposite directions;
prior to the detecting of the physical movement, the second display portion is facing a user of the computing device and is currently used as the primary display; and
the physical movement includes flipping the computing device over to cause the first display portion to face the user.

3. A system as described in claim 1, wherein:
the first display portion and the second display portion are facing opposite directions;
prior to the detecting of the physical movement, the first display portion is facing a user of the computing device and is currently used as the primary display; and
the physical movement includes turning the computing device to cause the first display portion to face another user.

4. A system as described in claim 1, wherein the physical movement includes transitioning the computing device from a closed posture to an open posture.

5. A system as described in claim 1, wherein the physical movement includes transitioning the computing device from one of a closed posture or an open posture to a flipped posture creating an orientation in which the first display portion and the second display portion are facing away from each other in opposite directions.

6. A system as described in claim 1, wherein the physical movement includes a hinge angle of the hinge being changed by an amount greater than a threshold value thereby adjusting a position of the at least one display portion of the plurality of display portions.

7. A system as described in claim 1, wherein the physical movement includes the computing device being lifted from a stationary location thereby adjusting a position of the at least one display portion of the plurality of display portions.

8. A system as described in claim 1, wherein:
the one or more sensors are disposed on each display portion of the plurality of display portions; and the one or more sensors include grip sensors and at least one of motion sensors or orientation sensors.

9. A system as described in claim 1, wherein the device is equipped with a plurality of different types of sensors, and wherein the operations, executed by the at least one processor, further comprise: determining a type of gesture associated with the physical movement of at least one display portion, selecting, from the plurality of different types of sensors, at least one grip sensor, as the one or more sensors, based on the type of gesture determined and the at least one display portion, and wherein only the at least one grip sensor, from the plurality of different types of sensors, is activated for the detecting of the context information.

10. A system as described in claim 1, wherein the plurality of sensors comprise one or more grip sensors, positioned on an external portion of the device, that are configured to detect the grip of the user with respect to each of the plurality of display portions during the physical movement.

11. A system as described in claim 10, wherein the one or more grip sensors comprise capacitive strips, positioned on the external portion of the device, configured to detect the grip of the user.

12. A system as described in claim 1, wherein the validating further comprises overriding the recognition that the first display portion is likely intended to be used as the primary display based on a result of the evaluation of the context information related to the grip of the user relative to the attribute data related to the grip of the user from the stored identity data of the user.

13. A method implemented by a computing device, the method comprising:
recognizing physical movement of at least one display portion of a plurality of display portions, associated with the computing device, as a device gesture to indicate that a first display portion of the plurality of display portions is intended to be used as a primary display;
detecting, from one or more sensors connected with the computing device, context information related to a grip of a user during the physical movement of the one or more of the at least one display portion;
analyzing the context information related to the grip of the user to determine an identity of the user;
analyzing attribute data related to the grip of the user from stored identity data of the user identified based on the identity of the user;
validating a recognition that the first of the plurality of display portions is intended to be used as the primary display based on an evaluation of the context information related to the grip of the user relative to the attribute data related to the grip of the user from the stored identity data of the user; and
initiating the first display portion as the primary display based on a result of the validating of the recognition that the first display portion is intended to be used as the primary display.

14. A method as described in claim 13, wherein the physical movement transitions the computing device from a first posture to a second posture thereby adjusting a position of the one or more of the at least one display portion.

15. A method as described in claim 13, wherein the physical movement changes an orientation of the computing device from a first orientation to a second orientation thereby adjusting a position of the one or more of the at least one display portion.

16. A method as described in claim 13, wherein the one or more sensors include grip sensors that detect the grip of the user.

17. A method as described in claim 13, wherein the one or more sensors include grip sensors and at least one of a camera, proximity sensors, hall effect sensors, magnetometers, and microphones.

18. A method implemented by a computing device, the method comprising:
displaying content via at least one of a first display portion or a second display portion, the first display portion connected to the second display portion via a hinge and the first display portion being used as a primary display;

recognizing a device gesture based on physical movement of the computing device, wherein the recognizing recognizes the physical movement as an input signal to indicate that the second display portion is intended to be used as the primary display;

detecting, from the one or more sensors, context information related to a grip of a user during the physical movement of the computing device;

analyzing the context information related to the grip of the user to determine an identity of the user;

analyzing attribute data related to the grip of the user from stored identity data of the user identified based on the identity of the user;

validating a recognition that the second display portion is to be used as the primary display based on an evaluation of the context information relative to the attribute data related to the grip of the user from the stored identity data of the user;

initiating the second display portion as the primary display based on a result of the validating of the recognition that the second display portion is intended to be the primary display.

19. A method as described in claim 18, further comprising: providing a user-selectable option to override the second display portion as the primary display; and overriding the second display portion as the primary display based on a user input that selects the user-selectable option.

20. A method as described in claim 18, wherein: the device gesture includes turning the computing device around effective to cause the first display portion to face away from user of the computing device.

* * * * *